United States Patent
Kim et al.

(10) Patent No.: US 9,560,563 B2
(45) Date of Patent: Jan. 31, 2017

(54) METHOD FOR RECEIVING SERVICE BY MEANS OF USER EQUIPMENT IN A WIRELESS COMMUNICATION SYSTEM AND APPARATUS FOR SAME

(71) Applicant: LG ELECTRONICS INC., Seoul (KR)

(72) Inventors: Sangwon Kim, Anyang-si (KR); Sungjun Park, Anyang-si (KR); Sunghoon Jung, Anyang-si (KR); Youngdae Lee, Anyang-si (KR); Seungjune Yi, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/359,288

(22) PCT Filed: Jan. 25, 2013

(86) PCT No.: PCT/KR2013/000635
§ 371 (c)(1),
(2) Date: May 19, 2014

(87) PCT Pub. No.: WO2013/112005
PCT Pub. Date: Aug. 1, 2013

(65) Prior Publication Data
US 2014/0342740 A1    Nov. 20, 2014

Related U.S. Application Data

(60) Provisional application No. 61/591,870, filed on Jan. 28, 2012, provisional application No. 61/645,639, filed on May 11, 2012.

(51) Int. Cl.
H04W 36/14    (2009.01)

(52) U.S. Cl.
CPC .................................. *H04W 36/14* (2013.01)

(58) Field of Classification Search
CPC ....... H04W 36/16; H04W 36/14; H04W 36/18
(Continued)

(56) References Cited

U.S. PATENT DOCUMENTS 8,923,244 B2 * 12/2014 Tinnakornsrisuphap  H04W 36/04
                                                      370/331
2010/0202307 A1 *  8/2010 Lee ................... H04W 36/0088
                                                      370/252

(Continued)

FOREIGN PATENT DOCUMENTS

| KR | 10-2010-0068784 | 6/2010 |
| KR | 10-2010-0069276 | 6/2010 |
| KR | 10-2011-0071815 | 6/2011 |

OTHER PUBLICATIONS

PCT International Application No. PCT/KR2013/000635, Written Opinion of the International Searching Authority dated May 29, 2013, 14 pages.

(Continued)

*Primary Examiner* — Kamran Afshar
*Assistant Examiner* — Farideh Madani
(74) *Attorney, Agent, or Firm* — Lee Hong Degerman Kang Waimey

(57) ABSTRACT

The present application discloses a method for receiving a service by means of a user equipment connected to a first network in a wireless communication system. More particularly, the method comprises: a step of transmitting, to a first network, a first message for radio access technology (RAT) change to a second network; a step of accessing the second network; and a step of receiving the service from the second network, wherein the service is provided only in the second network.

16 Claims, 10 Drawing Sheets

(58) Field of Classification Search
USPC .................... 455/436–444; 370/331, 332
See application file for complete search history.

(56) References Cited

U.S. PATENT DOCUMENTS

| | | | |
|---|---|---|---|
| 2010/0317348 A1* | 12/2010 | Burbidge .......... | H04W 36/0066 455/436 |
| 2011/0032924 A1* | 2/2011 | Lee .................... | H04W 76/048 370/345 |
| 2011/0176511 A1* | 7/2011 | Sayeedi ............ | H04W 36/0016 370/331 |

OTHER PUBLICATIONS

3rd Generation Partnership Project (3GPP), "Technical Specification Group Services and System Aspects; Architecture enhancements for non-3GPP accesses (Release 11)," 3GPP TS 23.402 V11.1.0, Dec. 2011, 232 pages (relevant pages: pp. 150-187).
PCT International Application No. PCT/KR2013/000635, Written Opinion of the International Searching Authority dated May 29, 2013, 10 pages.

* cited by examiner

FIG. 3
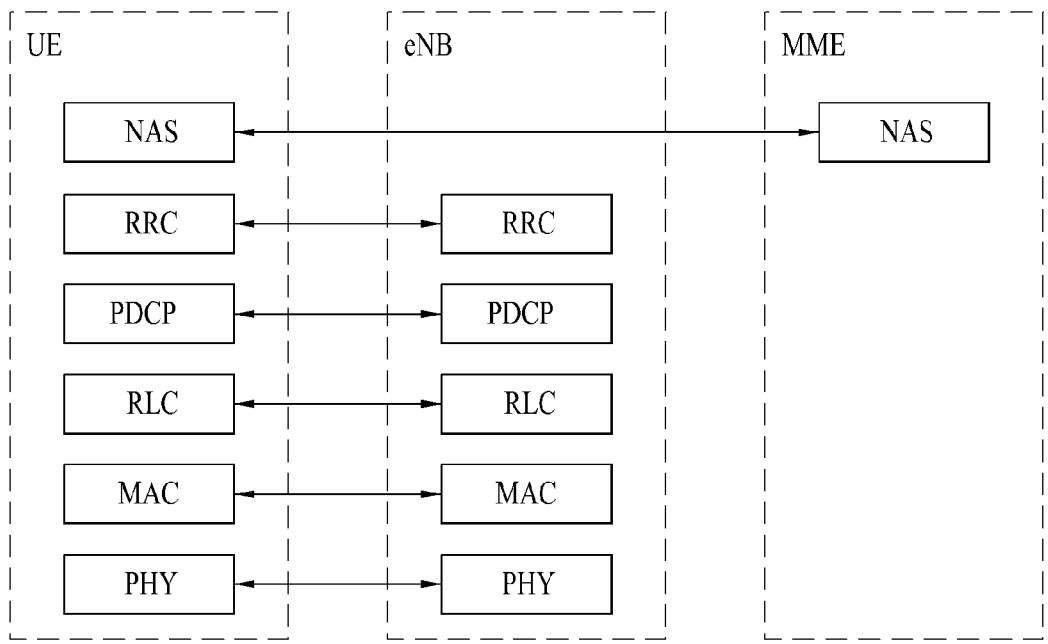
(a) Control-plane protocol stack
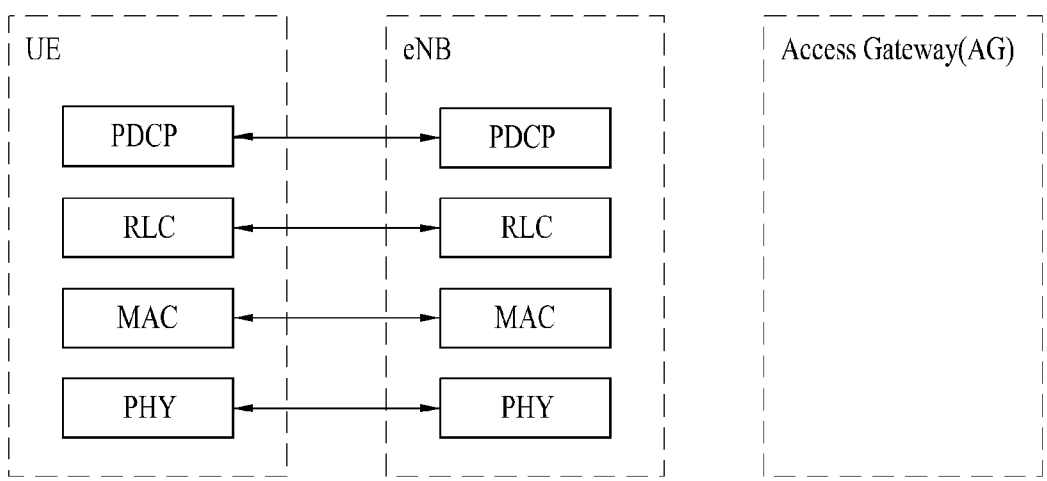
(b) User-plane protocol stack

METHOD FOR RECEIVING SERVICE BY MEANS OF USER EQUIPMENT IN A WIRELESS COMMUNICATION SYSTEM AND APPARATUS FOR SAME

CROSS-REFERENCE TO RELATED APPLICATIONS

This application is the National Stage filing under 35 U.S.C. 371 of International Application No. PCT/KR2013/000635, filed on Jan. 25, 2013, which claims the benefit of U.S. Provisional Application Ser. Nos. 61/591,870 filed on Jan. 28, 2012 and 61/645,639, filed on May 11, 2012, the contents of which are all hereby incorporated by reference herein in their entirety.

TECHNICAL FIELD

The present invention relates to a wireless communication system and, more particularly, to a method for receiving a service provided by a heterogeneous radio access technology (RAT) cell only at a user equipment (UE) connected to a specific RAT cell.

BACKGROUND ART

As an example of a wireless communication system to which the present invention is applicable, a $3^{rd}$ Generation Partnership Project (3GPP) Long Term Evolution (LTE) communication system will be schematically described.

FIG. 1 is a diagram showing a network structure of an Evolved Universal Mobile Telecommunications System (E-UMTS) as a wireless communication system. The E-UMTS is an evolved form of the UMTS and has been standardized in the 3GPP. Generally, the E-UMTS may be called a Long Term Evolution (LTE) system. For details of the technical specifications of the UMTS and E-UMTS, refer to Release 7 and Release 8 of "$3^{rd}$ Generation Partnership Project; Technical Specification Group Radio Access Network".

Referring to FIG. 1, the E-UMTS mainly includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist per eNB. The cell is set to use a bandwidth such as 1.25, 2.5, 5, 10, 15 or 20 MHz to provide a downlink or uplink transmission service to several UEs. Different cells may be set to provide different bandwidths. The eNB controls data transmission or reception of a plurality of UEs. The eNB transmits downlink (DL) scheduling information of DL data so as to inform a corresponding UE of time/frequency domain in which data is transmitted, coding, data size, and Hybrid Automatic Repeat and reQest (HARQ)-related information. In addition, the eNB transmits uplink (UL) scheduling information of UL data to a corresponding UE so as to inform the UE of a time/frequency domain which may be used by the UE, coding, data size and HARQ-related information. An interface for transmitting user traffic or control traffic can be used between eNBs. A Core Network (CN) may include an AG, a network node for user registration of the UE, etc. The AG manages mobility of a UE on a Tracking Area (TA) basis. One TA includes a plurality of cells.

Although wireless communication technology has been developed up to Long Term Evolution (LTE) based on Wideband Code Division Multiple Access (WCDMA), the demands and the expectations of users and providers continue to increase. In addition, since other radio access technologies have been continuously developed, new technology evolution is required to secure high competitiveness in the future. Decrease in cost per bit, increase in service availability, flexible use of a frequency band, simple structure, open interface, suitable User Equipment (UE) power consumption and the like are required.

DISCLOSURE

Technical Problem

An object of the present invention devised to solve the problem lies in a method for receiving a service by a user equipment (UE) in a wireless communication system and an apparatus for the same.

Technical Solution

The object of the present invention can be achieved by providing a method for receiving a service at a user equipment connected with in a first network including transmitting, to the first network, a first message for a change of a RAT (Radio Access Technology) to a second network, accessing the second network, and receiving the service from the second network, wherein the service is provided from the second network only.

The first message may include a connection release request message for releasing a connection with the first network. In this case, accessing the second network may include performing a cell reselection procedure to connect the second network.

The first message may include a RAT change request message for requesting the change of the RAT form the first network to the second network. In this case, accessing the second network may include performing a handover to the second network.

The connection release request message or the RAT change request message may include a cause field configured as a value corresponding to a reception of an inter-RAT service.

The method may further include receiving information on at least one service provided from the second network, and the information may be broadcasted by the second network or may be received from the first network.

The method may further include receiving, from the first network, a second message for rejecting the change of the RAT. A retransmission of the first message may be prohibited during a predetermined duration.

The first message may be transmitted only when the change of the RAT is required for receiving the service.

Advantageous Effects

According to the embodiments of the present invention, by providing a method for transmitting a message for requesting connection with a heterogeneous RAT cell to a network in order to enable a user equipment (UE) to receive a service provided by the heterogeneous RAT cell, the network or the UE can timely change the RAT and, as a result, the UE can receive a desired service.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

FIG. 3 is a diagram showing a control plane and a user plane of a radio interface protocol architecture between a User Equipment (UE) and an Evolved Universal Terrestrial Radio Access Network (E-UTRAN) based on a $3^{rd}$ Generation Partnership Project (3GPP) radio access network standard.

BEST MODE

The configuration, operation and other features of the present invention will be understood by the embodiments of the present invention described with reference to the accompanying drawings. The following embodiments are examples of applying the technical features of the present invention to a $3^{rd}$ Generation Partnership Project (3GPP) system.

Although, for convenience, the embodiments of the present invention are described using the LTE system and the LTE-A system in the present specification, the embodiments of the present invention are applicable to any communication system corresponding to the above definition.

Figure 1:
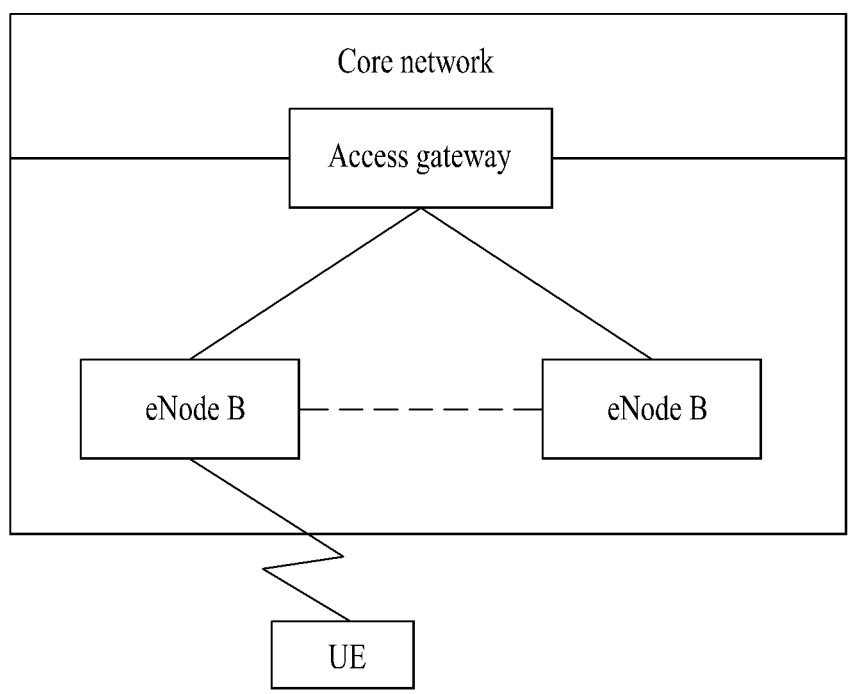
FIG. 1 is a diagram showing a network structure of an Evolved Universal Mobile Telecommunications System (E-UMTS) as an example of a wireless communication system.
Figure 2:
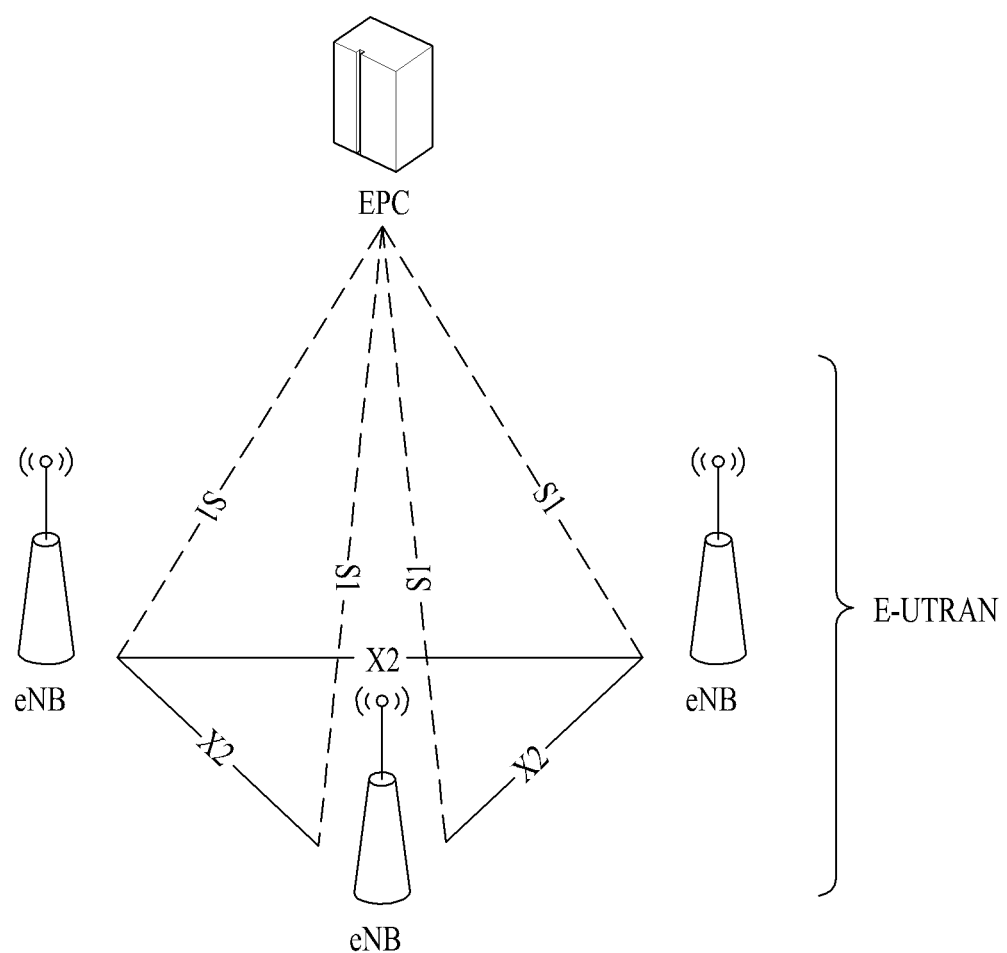
FIG. 2 is a diagram showing the concept of a network structure of an Evolved Universal Terrestrial Radio Access Network (E-UTRAN).

FIG. 2 is a diagram showing the concept of a network structure of an Evolved Universal Terrestrial Radio Access Network (E-UTRAN). In particular, the E-UTRAN system is a system evolved from the existing UTRAN system. The E-UTRAN includes eNBs and eNBs are connected via an X2 interface. A cell is connected to a user equipment (UE) via an air interface and is connected to an evolved packet core (EPC) via an S1 interface.

The EPC includes a mobility management entity (MME), a serving-gateway (S-GW) and a packet data network-gateway (PDN-GW). The MME has access information of a UE and information about capabilities of the UE. Such information is mainly used for mobility management of the UE. The S-GW is a gateway having an E-UTRAN as an end point and the PDN-GW is a gateway having a PDN as an end point.

FIG. 3 shows a control plane and a user plane of a radio interface protocol between a UE and an Evolved Universal Terrestrial Radio Access Network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer of a first layer provides an information transfer service to a higher layer using a physical channel. The PHY layer is connected to a Medium Access Control (MAC) layer located on a higher layer via a transport channel. Data is transported between the MAC layer and the PHY layer via the transport channel. Data is also transported between a physical layer of a transmitting side and a physical layer of a receiving side via a physical channel. The physical channel uses a time and a frequency as radio resources. More specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A Medium Access Control (MAC) layer of a second layer provides a service to a Radio Link Control (RLC) layer of a higher layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 packet or an IPv6 packet in a radio interface having a relatively small bandwidth.

A Radio Resource Control (RRC) layer located at the bottom of a third layer is defined only in the control plane and is responsible for control of logical, transport, and physical channels in association with configuration, re-configuration, and release of Radio Bearers (RBs). The RB is a service that the second layer provides for data communication between the UE and the network. To accomplish this, the RRC layer of the UE and the RRC layer of the network exchange RRC messages.

One cell of the eNB is set to use a bandwidth such as 1.25, 2.5, 5, 10, 15 or 20 MHz to provide a downlink or uplink transmission service to several UEs. Different cells may be set to provide different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. Traffic or control messages of a downlink multicast or broadcast service may be transmitted through a downlink SCH and may also be transmitted through a downlink multicast channel (MCH).

Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 4:
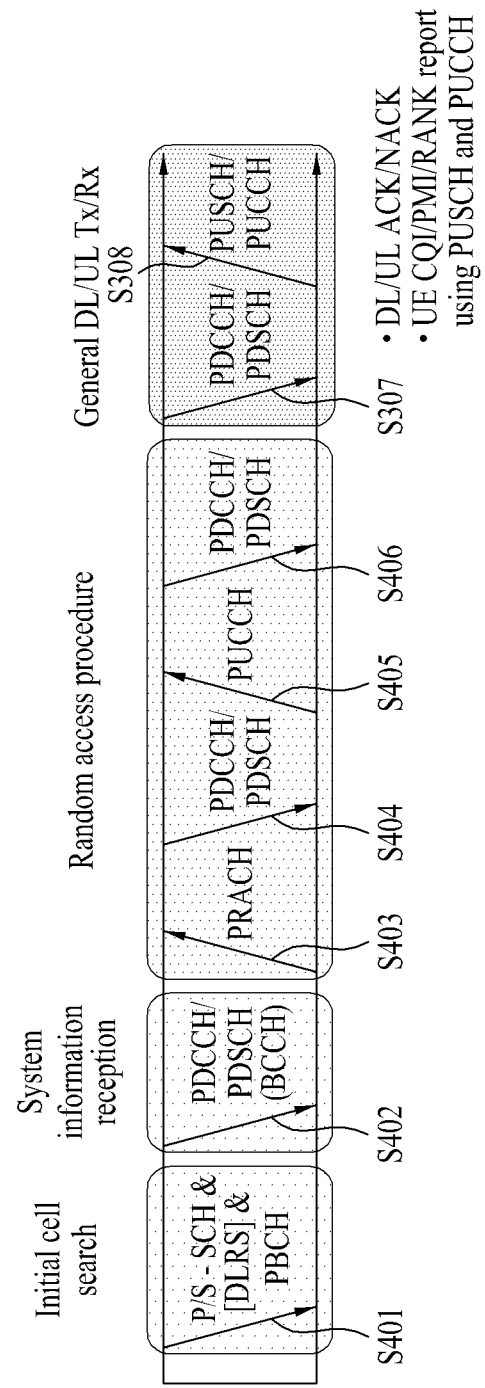
FIG. 4 is a diagram showing physical channels used in a 3GPP system and a general signal transmission method using the same.

FIG. 4 is a diagram showing physical channels used in a 3GPP system and a general signal transmission method using the same.

A UE performs an initial cell search operation such as synchronization with an eNB when power is turned on or the UE enters a new cell (S401). The UE may receive a Primary Synchronization Channel (P-SCH) and a Secondary Synchronization Channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to confirm a downlink channel state in the initial cell search step.

The UE, which has completed the initial cell search, may receive a Physical Downlink Control Channel (PDCCH) and a Physical Downlink Shared Channel (PDSCH) according to information included in the PDCCH so as to acquire more detailed system information (S402).

Meanwhile, if the eNB is initially accessed or radio resources for signal transmission are not present, the UE may perform a Random Access Procedure (RACH) (step S403 to S406) with respect to the eNB. In this case, the UE may transmit a specific sequence through a Physical Random Access Channel (PRACH) as a preamble (S403), and receive a response message of the preamble through the PDCCH and the PDSCH corresponding thereto (S404). In the case of contention-based RACH, a contention resolution procedure may be further performed.

The UE, which has performed the above procedures, may perform PDCCH/PDSCH reception (S407) and Physical Uplink Shared Channel PUSCH)/Physical Uplink Control Channel (PUCCH) transmission (S408) as a general uplink/downlink signal transmission procedure. In particular, the UE receives downlink control information (DCI) through a PDCCH. Here, the DCI includes control information such as resource allocation information of the UE and the format thereof differs according to the use purpose.

The control information transmitted from the UE to the eNB in uplink or transmitted from the eNB to the UE in downlink includes a downlink/uplink ACK/NACK signal, a Channel Quality Indicator (CQI), a Precoding Matrix Index (PMI), a Rank Indicator (RI), and the like. In the case of the 3GPP LTE system, the UE may transmit the control information such as CQI/PMI/RI through the PUSCH and/or the PUCCH.

Figure 5:
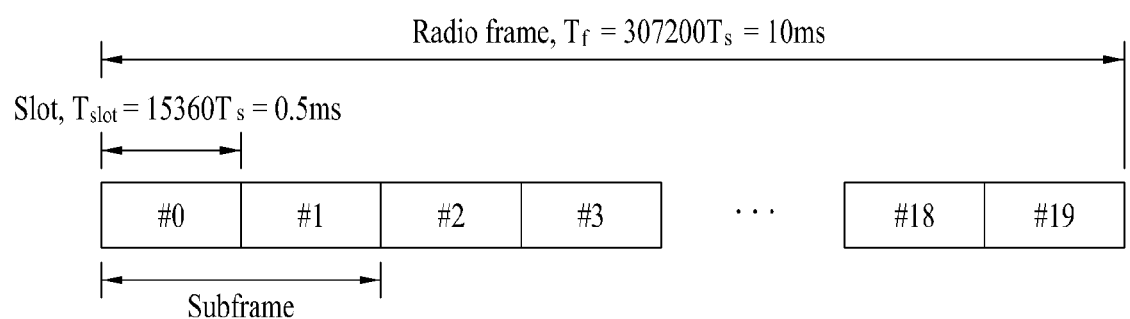
FIG. 5 is a diagram showing the structure of a radio frame used in a Long Term Evolution (LTE) system.

FIG. 5 is a diagram showing the structure of a radio frame used in a Long Term Evolution (LTE) system.

Referring to FIG. 5, the radio frame has a length of 10 ms ($327200 \times T_s$) and includes 10 subframes with the same size. Each of the subframes has a length of 1 ms and includes two slots. Each of the slots has a length of 0.5 ms ($15360 \times T_s$). $T_s$ denotes a sampling time, and is represented by $T_s=1/(15 \text{ kHz} \times 2048)=3.2552 \times 10^{-8}$ (about 33 ns). Each slot includes a plurality of OFDM symbols in a time domain, and includes a plurality of resource blocks (RBs) in a frequency domain. In the LTE system, one RB includes 12 subcarriers×7(6) OFDM or SC-FDMA symbols. A Transmission Time Interval (TTI) which is a unit time for transmission of data may be determined in units of one or more subframes. The structure of the radio frame is only exemplary and the number of subframes included in the radio frame, the number of slots included in the subframe, or the number of OFDM symbols included in the slot may be variously changed.

Hereinafter, an RRC state of a UE and an RRC connection method will be described.

The RRC state indicates whether the RRC layer of the UE is logically connected to the RRC layer of the E-UTRAN, is referred to as an RRC_CONNECTED state if connected, and is referred to as an RRC_IDLE state if not connected.

Since the E-UTRAN can check presence of the UE of the RRC_CONNECTED state in cell units, it is possible to efficiently control the UE. In contrast, the E-UTRAN cannot check presence of a UE of the RRC_IDLE state and a core network (CN) manages the UE of the RRC_IDLE state in a tracking area (TA) unit which is greater than a cell. That is, the RRC_IDLE state of the UE should transition to the RRC_CONNECTED state in order to receive a service, such as voice or data.

In particular, when a user initially powers a UE on, the UE first searches for an appropriate cell and camps on the cell in an RRC_IDLE state. When RRC connection needs to be established, the UE which is in the RRC_IDLE state is RRC connected to the E-UTRAN via an RRC connection establishment procedure so as to transition to the RRC_CONNECTED state. For example, if uplink data transmission is necessary due to call connection attempt of a user or if a response message is transmitted in response to a paging message received from the E-UTRAN, the UE which is in the idle state needs to be RRC connected to the E-UTRAN.

Figure 6:
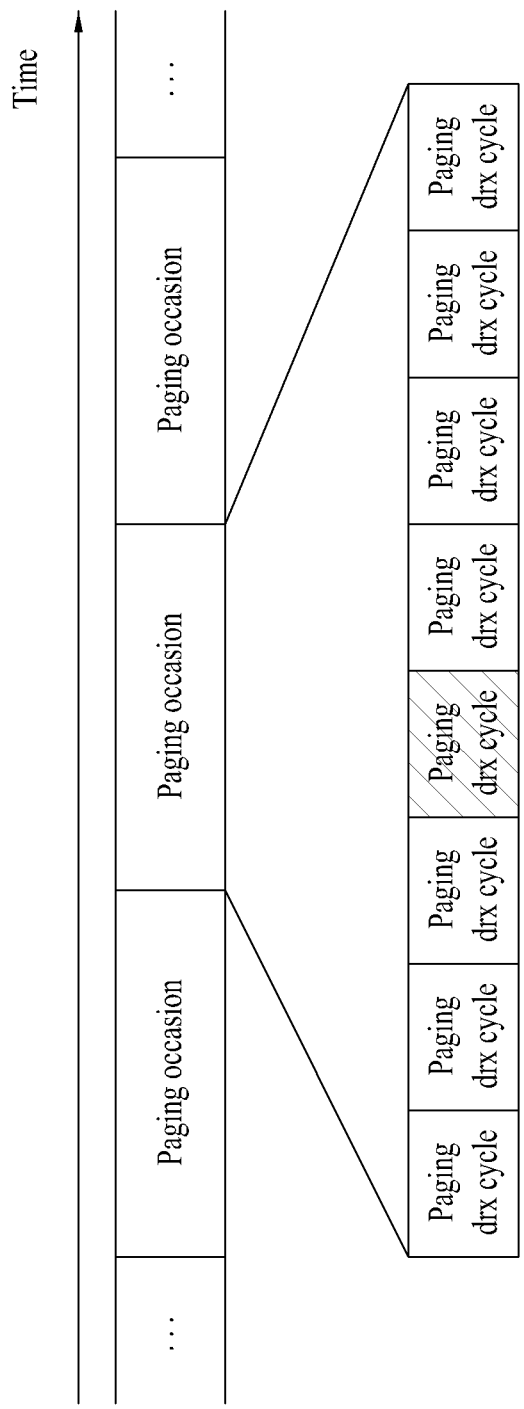
FIG. 6 is a diagram illustrating a general transmission and reception method using a paging message.

FIG. 6 is a diagram illustrating a general transmission and reception method using a paging message.

Referring to FIG. 6, the paging message includes a paging record including a paging cause and a UE identity. When the paging message is received, the UE may perform discontinuous reception (DRX) for the purpose of reducing power consumption.

More specifically, a network configures several paging occasions (POs) in every time cycle called a paging DRC cycle and a specific UE receives only a specific paging occasion and acquires a paging message. The UE does not receive a paging channel in occasions other than the specific occasion and may be in a sleep state in order to reduce power consumption. One paging occasion corresponds to one TTI.

The eNB and the UE use a paging indicator (PI) as a specific value indicating transmission of a paging message. The eNB may define a specific identity (e.g., paging-radio network temporary identity (P-RNTI) as the PI and inform the UE of paging information transmission. For example, the UE awakes in every DRX cycle and receives one subframe in order to check whether a paging message is received. If a P-RNTI is present in an L1/L2 control channel (PDCCH) of a subframe received by the UE, the UE may confirm that a paging message is present in a PDSCH of the subframe. In addition, if the identity (e.g., IMSI) of the UE is present in the paging message, the UE responds to the eNB (e.g., receives RRC connection or system information) and receives a service from the eNB.

Next, system information will be described. The system information includes essential information necessary to connect a UE to an eNB. Accordingly, the UE should receive all system information before being connected to the eNB and always have new system information. Since all UEs located in a cell should know system information, the eNB periodically transmits the system information.

The system information may be divided into a master information block (MIB), a scheduling block (SB) and a system information block (SIB). The MIB enables a UE to become aware of a physical configuration of a cell, for example, a bandwidth. The SB indicates transmission information of SIBs, for example, a transmission period. The SIB is a set of associated system information. For example, a specific SIB includes only information about peripheral cells and another SIB includes only information about an uplink radio channel used by a UE.

Hereinafter, a cell selection and cell reselection process will be described.

If a UE is powered on, the UE selects a cell having appropriate quality and performs a preparation procedure for receiving a service. A UE in an RRC_IDLE state should always select appropriate quality and prepare to receive a service from the cell. For example, a UE which is just turned on should select a cell having appropriate quality in order to perform registration with a network. If a UE in an RRC_CONNECTED state enters an RRC_IDLE state, the UE should select a cell on which the UE will camp in the RRC_IDLE state. A process of, at a UE, selecting a cell satisfying a specific condition in order to camp on the cell in a service standby state such as an RRC_IDLE state is referred to as cell selection. Since cell selection is performed in a state in which the UE does not determine a cell on which the UE camps in the RRC_IDLE state, it is important to select a cell as fast as possible. Accordingly, a cell which provides radio signal quality equal to or greater than a predetermined reference may be selected in the cell selection process of the UE, although the cell does not provide the best radio signal quality to the UE.

If a UE selects a cell satisfying a cell selection reference, the UE receives information necessary for operation of the UE in an RRC_IDLE state in the cell from system information of the cell. The UE receives all information necessary for operation of the RRC IDLE state and then requests a service from a network or waits reception of a service from the network in the RRC_IDLE state.

After a UE selects a certain cell in a cell selection process, the intensity or quality of a signal between the UE and an eNB may be changed due to mobility of the UE or wireless environment change. Accordingly, if the quality of the selected cell deteriorates, the UE may select another cell which provides better quality. If the cell is reselected, a cell which provides better signal quality than that of a currently selected cell is generally selected. Such a process is referred to as cell reselection. The cell reselection process is performed in order to select a cell which provides the best quality to the UE from the viewpoint of the quality of the radio signal. In addition to the quality of the radio signal, the network may set priority per frequency and inform the UE of the priority. The UE, which has received the priority, preferentially takes the priority into consideration, rather than radio signal quality.

Hereinafter, a multimedia broadcast multicast service (MBMS) will be described. The MBMS is one of broadcast/multicast services and is a service for simultaneously transmitting multimedia data packets to a plurality of UEs. The terms "broadcast/multicast service" and "MBMS" used in the present specification may be replaced with the terms "one-to-multiple service" and "multicast and broadcast service (MBS)", respectively. In the MBMS, UEs share resources necessary for data packet transmission to receive the same multimedia data based on IP multicast. Accordingly, when UEs using the MBMS are present in the same cell, resource efficiency may be increased. Since the MBMS is not related to an RRC_CONNECTED state, a UE in an RRC_IDLE state may receive the service.

A MBMS logical channel MBMS control channel (MCCH) or MBMS traffic channel (MTCH) may be mapped to a transport channel MBMS channel (MCH). The MCCH transmits an RRC message including MBMS common control information and the MTCH transmits specific MBMS traffic. One MCCH is present in one MBMS single frequency network (MBSFN) region for transmitting the same MBMS information or traffic and, when a plurality of MBSFN regions is provided by one cell, a UE may receive a plurality of MCCHs.

In the following description, a radio access technology (RAT) means Long Term Evolution (LTE), Universal Mobile Telecommunications System (UMTS), Global System for Mobile Communications (GSM), Code division Multiple Access (CDMA) and all technologies corresponding thereto.

In the present invention, assume that a MBMS service and a service similar thereto are provided by a specific RAT cell only. However, according to the current LTE standard, when a UE is not connected to another RAT cell for providing the MBMS service and the service similar thereto, that is, when a UE is connected to an LTE cell, in order to receive the MBMS service and the service similar thereto provided by another RAT cell, the UE may not request to change a connection to another RAT cell from the LTE cell and may not change the current RAT (that is, LTE) cell to another RAT cell.

Accordingly, although the UE supports a plurality of RATs and is located in a RAT cell for providing a desired service, when the UE is connected to another RAT cell other than the RAT cell for providing the service, the UE may not receive the service. That is, the UE connected to the LTE network may not transmit, to the LTE network, a message for requesting to change a connection to a UMTS network, in order to receive a service provided by the UMTS network only.

The UE, to which the present invention is applicable, supports two or more RATs and specific RAT and RRC connection or similar connection thereto may be restricted to predetermined UEs.

Further, in the present invention, another RAT cell may broadcast information on a service provided thereby within the cell and the UE may receive the information broadcast by another RAT cell other than a currently connected RAT cell and recognize the service provided by a heterogeneous RAT cell. More specifically, all RAT cells may broadcast information on services provided by peripheral heterogeneous RAT cells to UEs. The information on the services may include at least one of service list information per RAT, service list information per frequency of a heterogeneous RAT, information on a time for providing a service of a heterogeneous RAT and information on a place where a service of a heterogeneous RAT is provided (e.g., a MBSFN region).

First Embodiment

In the first embodiment of the present invention, in order to enable a UE to receive a service provided by a specific RAT cell, a method for determining whether a RAT cell other than a currently connected RAT cell provides a service desired by a UE and transmitting a message for requesting to change a connection to the RAT cell for providing the desired service is proposed. Preferably, the UE may transmit the connection change request message to the currently connected RAT.

The connection change request message may include information on the RAT cell for providing the desired service, frequency information of the RAT or cell information of the RAT. Alternatively, the connection change request message may include connection release request information of the currently connected RAT cell. The connection release request information may include a newly defined connection release cause. The newly defined connection release cause may include connection release for reception of the service of the heterogeneous RAT cell.

As a triggering condition of connection change request message transmission, the UE may be restricted to transmit the connection change request message to the network only when the service provided by another RAT cell cannot be received in a state in which the currently connected RAT cell is not changed. Further, channel quality from the RAT cell for providing the service desired by the UE, that is, another RAT cell, may be measured and the UE may be restricted to transmit the connection change request message to the network, that is, the currently connected RAT cell only when it is determined that channel quality is equal to or greater than a reference value or service reception is possible.

Figure 7:
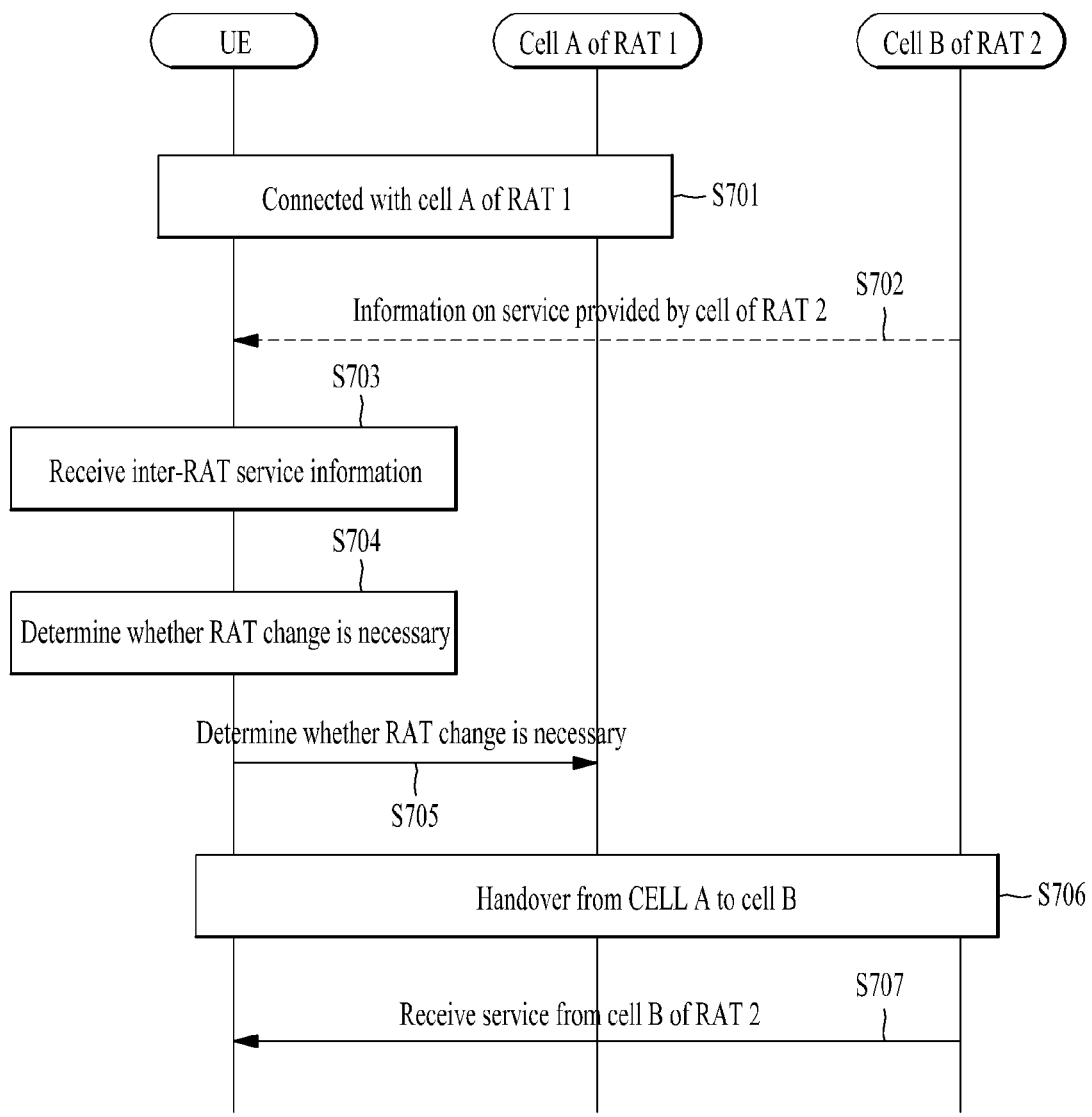
FIG. 7 is a diagram showing an example of receiving a service provided by a heterogeneous RAT cell according to a first embodiment of the present invention.

FIG. 7 shows an example of receiving a service provided by a heterogeneous RAT cell according to a first embodiment of the present invention. In particular, FIG. 7 shows an example of transmitting a RAT connection change request message at a UE. The UE is currently connected to a cell A of a RAT 1 in step 701 and a cell B of a heterogeneous RAT 2 broadcasts information on a service provided thereby in step 702.

Referring to FIG. 7, the UE receives service information broadcast by the cell B of the RAT 2 in step 702, that is, inter-RAT service information, in step 703. Subsequently, using the received inter-RAT service information, it is determined whether a connection needs to be changed from the currently connected cell of the RAT 1 to the cell of the RAT 2. When the inter-RAT service may be received without connection change by adding a frequency of the RAT 2 to the frequency of the RAT 1 using a carrier aggregation scheme, etc., it may be determined that connection change is not necessary.

However, when it is determined that the connection needs to be changed to the RAT 2, the UE transmits a RAT connection change request message for changing the connection to the RAT 2 to the network of the RAT 1, that is, the cell of the RAT 1. The RAT connection change request message may include information on the RAT 2 or the information on the cell B of the RAT 2.

Subsequently, the network of the RAT 1, which has received the connection request information, transmits a handover command message to the UE in step 706 to perform a handover from the cell A of the RAT 1 to the cell B of the RAT 2 and the UE receives an inter-RAT service, that is, a service provided by the cell B of the RAT 2 only in step 707 after the handover to the cell B of the RAT 2.

Figure 8:
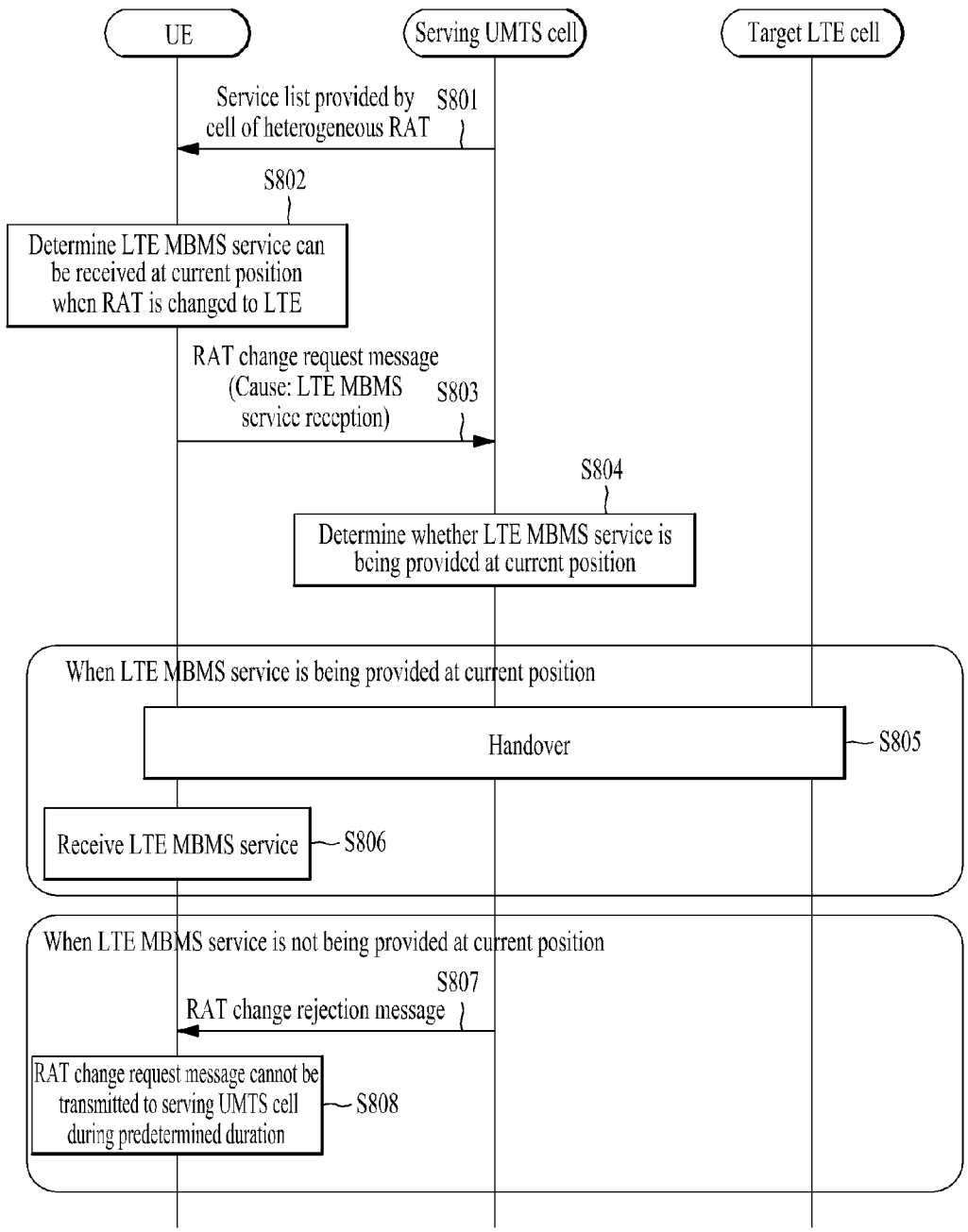
FIG. 8 is a diagram showing another example of receiving a service provided by a heterogeneous RAT cell according to a first embodiment of the present invention.

FIG. 8 is a diagram showing another example of receiving a service provided by a heterogeneous RAT cell according to a first embodiment of the present invention. In particular, FIG. 8 also shows an example of transmitting a RAT connection change request message at a UE. The UE is currently connected to a serving UMTS cell and receives a MBMS service provided by a cell of LTE which is a heterogeneous RAT only.

Referring to FIG. 8, in step 801, the UE may receive, from the serving UMTS cell, information on a service list provided by the cell of LTE which is a heterogeneous RAT. Using such information, the UE may determine whether an LTE MBMS service can be received at a current position when the RAT is changed to LTE, in step 802, and transmit a RAT change request message to the serving UMTS cell when the LTE MBMS service can be received, in step 803.

In particular, the RAT change request message may include a connection change cause field. In the present invention, the change cause field may be set to LTE MBMS reception or a predetermined value corresponding thereto. In determination of step 802, whether the LTE MBMS service can be received is temporarily determined using only the information on the service list provided by the LTE cell. When the information on the service list provided by the LTE cell includes details such as a service provision time, step 804 may be omitted.

That is, in step 804, the UE may determine whether the LTE MBMS service is being provided at a current position. When the LTE MBMS is being provided at the current position, in step 805, handover to the LTE cell which is a target cell may be performed in step 805 and then the LTE MBMS service may be received in step 806.

However, when the LTE MBMS is not being provided at the current position, the serving UMTS cell may transmit a RAT change rejection message in step 807. The UE, which has received such a message, is preferably defined not to transmit the RAT change request message to the serving UMTS cell during a predetermined period in step 808.

Second Embodiment

In the second embodiment of the present invention, in order to receive a service provided by a heterogeneous RAT cell, a UE may not transmit a RAT change request message but may transmit, to a current RAT cell, a connection release message for releasing a connection with the current RAT cell or may directly release a connection with the current RAT cell without informing the current RAT cell that the connection is released.

In this case, the current RAT cell may recognize that the connection has been automatically released due to radio link failure (RLF) when a response to paging, etc. is not received from the UE during a predetermined duration.

Unlike the LTE standard, according to the UMTS standard, the UE may transmit a connection release message to the currently connected UMTS cell. For convenience of description, assume that the UE is being connected to the UMTS cell and wishes to receive a service from another RAT cell, e.g., an LTE cell only. In this case, the UE includes a connection release cause for reception of a service from a heterogeneous RAT cell in the connection release message and transmit the message to the network, that is, the UMTS cell. Alternatively, a new message may be defined in addition to the connection release message, the connection release cause may be included in the new message and the UE may transmit the new message to the UMTS cell.

In addition, similarly to the RAT connection change request message, as a triggering condition of connection release message transmission, the UE may be restricted to transmit the connection release message to the network only when the service provided by another RAT cell cannot be received in a state in which the currently connected RAT cell is not changed.

Preferably, channel quality from the RAT cell for providing the service desired by the UE, that is, another RAT cell, may be measured and, the UE may be restricted to transmit the connection release message to the network, that is, the currently connected RAT cell only when it is determined that channel quality is equal to or greater than a reference value or service reception is possible.

Figure 9:
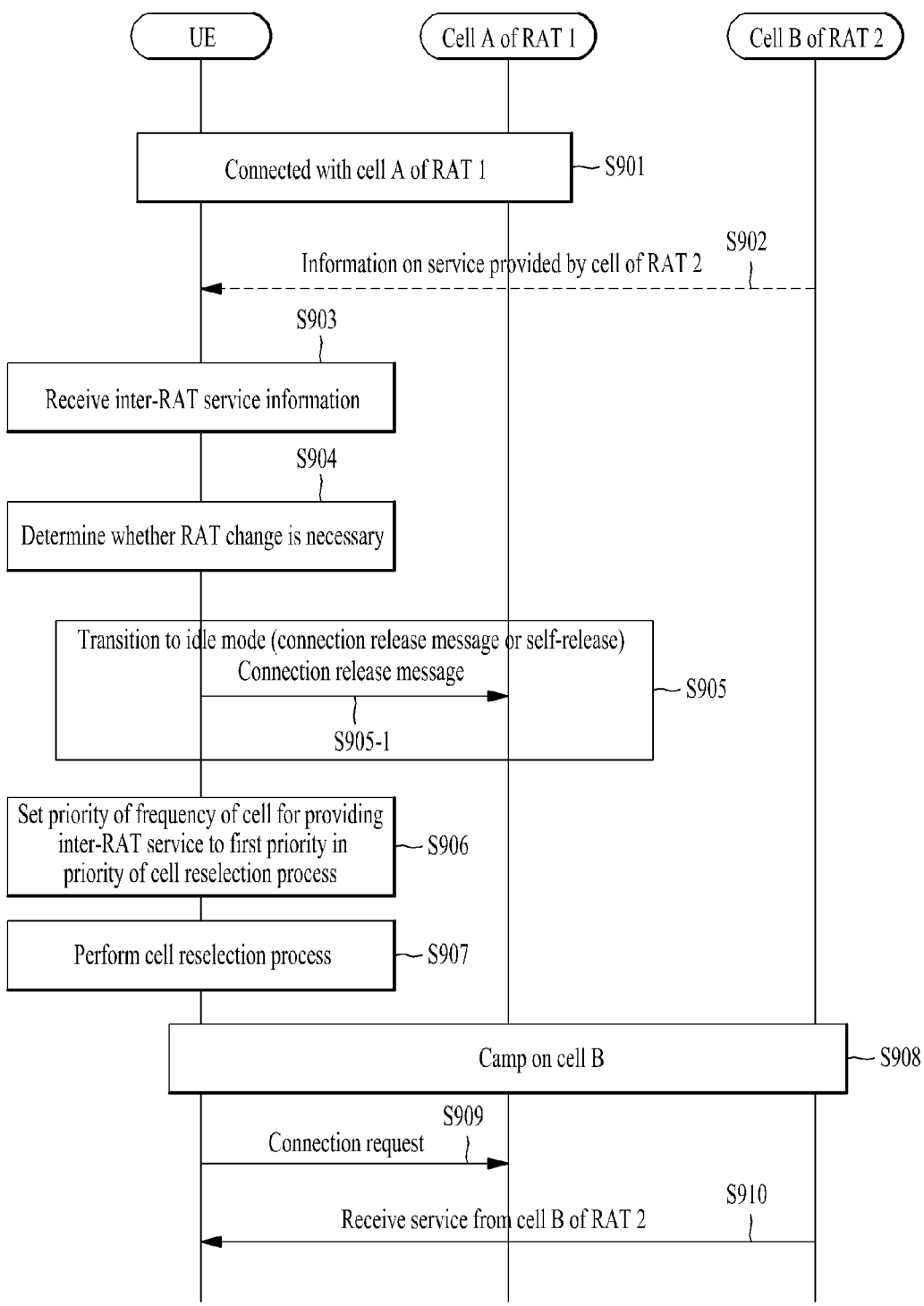
FIG. 9 is a diagram showing an example of receiving a service provided by a heterogeneous RAT cell according to a second embodiment of the present invention.

FIG. 9 is a diagram showing an example of receiving a service provided by a heterogeneous RAT cell according to a second embodiment of the present invention. In particular, assume that a UE is currently connected to a cell A of a RAT 1 in step 901 and a cell B of a heterogeneous RAT 2 broadcasts service information provided thereby in step 902.

Referring to FIG. 9, the UE receives service information broadcast by the cell B of the RAT 2 in step 902, that is, inter-RAT service information in step 903. Subsequently, using the received inter-RAT service information, it is determined whether a connection needs to be changed from the currently connected cell of the RAT 1 to the cell of the RAT 2. When the inter-RAT service may be received without connection change by adding a frequency of the RAT 2 to the frequency of the RAT 1 using a carrier aggregation scheme, etc., it may be determined that connection change is not necessary.

However, when it is determined that the connection needs to be changed to the RAT 2, the UE may transmit a connection release message to the cell A of the RAT 1 in order to request to release the connection with the cell of the RAT 1 or release the connection with the cell of the RAT 1, in step 904-1. As a result, the UE transitions to the idle mode in step 904. When the UE transmits the connection release message to the cell A of the RAT 1 in step 904-1, the UE receives the connection release message including a connection release command from the cell A of the RAT 1 (not shown) and transitions to the idle mode.

Subsequently, the UE sets the priority of the frequency of the RAT 2 or the cell B of the RAT 2 for providing the service to be received to first priority in priority used in a cell reselection process. In the method of setting the priority of the frequency, the following method may be used.

When the UE does not know frequency information of the heterogeneous RAT service to be received, the UE sets the priority of an arbitrary frequency of the RAT cell for providing the service to first priority.

When the UE knows a start time of the heterogeneous RAT service to be received, the UE changes the priority of the frequency at the start time of the service or earlier than the start time of the service. When time information of the heterogeneous RAT service to be received by the UE is not present or when the service is unrelated to time, the UE immediately changes the priority when the heterogeneous RAT service is received.

When it is determined that the UE cannot receive the heterogeneous RAT service even when the UE moves to the cell of the RAT for providing the heterogeneous RAT service to be received, the UE does not change the priority of the frequency. The UE may make the determination via position information of the heterogeneous RAT service to be received.

After the priority has been controlled, the UE may perform a cell reselection process based on the changed priority of the frequency in step 907 and camp on the cell B of the RAT 2 for providing the service to be received in step 908. In addition, the UE performs the connection process (e.g., RRC connection establishment process) with the cell B of the RAT 2 in step 909 and then receives the service from the cell B of the RAT 2 in step 910. When the service does not require a series of processes such as the RRC connection establishment process, step 909 may be omitted and step 910 may be immediately performed.

Figure 10:
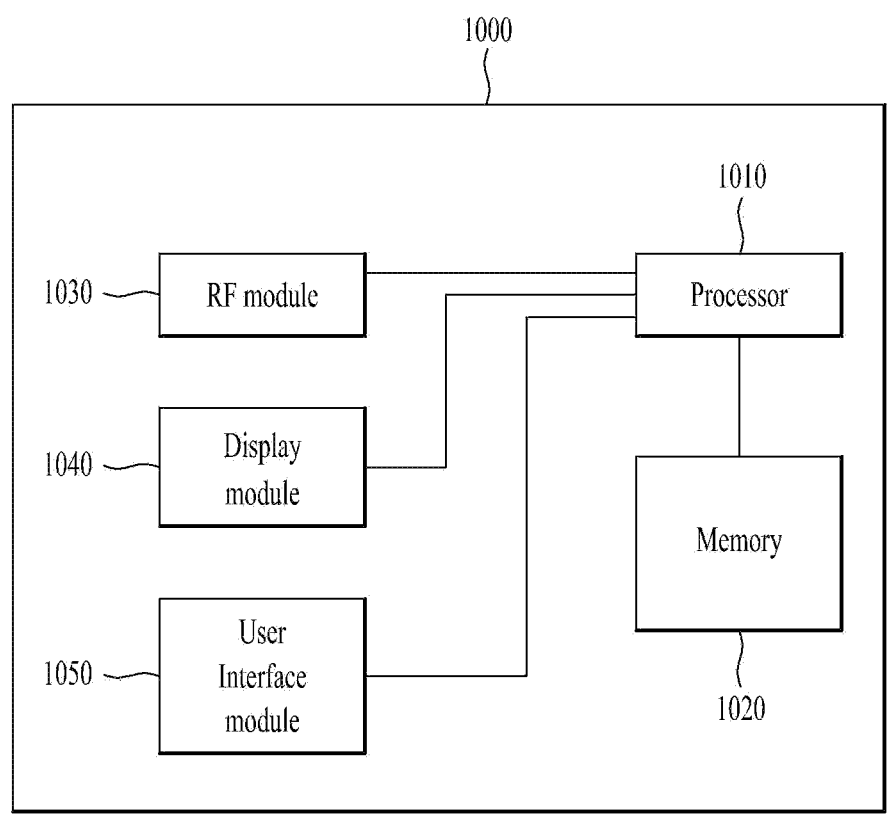
FIG. 10 is a block diagram of a communication apparatus according to one embodiment of the present invention.

FIG. 10 is a block diagram of a communication apparatus according to one embodiment of the present invention.

Referring to FIG. 10, a communication apparatus 1000 includes a processor 1010, a memory 1020, a Radio Frequency (RF) module 1030, a display module 1040 and a user interface module 1050.

The communication apparatus 1000 is shown for convenience of description and some modules thereof may be omitted. In addition, the communication apparatus 1000 may further include necessary modules. In addition, some modules of the communication apparatus 1000 may be subdivided. The processor 1010 is configured to perform an operation of the embodiment of the present invention described with reference to the drawings. For a detailed description of the operation of the processor 1010, reference may be made to the description associated with FIGS. 1 to 9.

The memory 1020 is connected to the processor 1010 so as to store an operating system, an application, program code, data and the like. The RF module 1030 is connected to the processor 1010 so as to perform a function for converting a baseband signal into a radio signal or converting a radio signal into a baseband signal. The RF module 1030 performs analog conversion, amplification, filtering and frequency up-conversion or inverse processes thereof. The display module 1040 is connected to the processor 1010 so as to display a variety of information. As the display module 1040, although not limited thereto, a well-known device such as a Liquid Crystal Display (LCD), a Light Emitting Diode (LED), or an Organic Light Emitting Diode (OLED) may be used. The user interface module 1050 is connected to the processor 1010 and may be configured by a combination of well-known user interfaces such as a keypad and a touch screen.

The above-described embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

The embodiments of the present invention can be implemented by a variety of means, for example, hardware, firmware, software, or a combination thereof. In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Although an example in which a method for receiving a service at a user equipment (UE) in a wireless communication system and an apparatus for the same is applied to a 3GPP LTE system is described, the present invention is applicable to various wireless communication systems in addition to the 3GPP LTE system.

The invention claimed is:

1. A method for receiving a service at a user equipment (UE) connected to a first network, the method comprising:
   receiving, by the UE, information on at least one service provided from a second network, the information being broadcasted by the second network; and
   when the at least one service comprises a Multimedia Broadcast Multicast Service (MBMS), and when the second network supports the MBMS and the first network does not support the MBMS,
      determining, whether it is necessary for the UE to release a connection with the first network in order to change a RAT (Radio Access Technology) to the second network or not;
      transmitting, by the UE to the first network based on the determining, a Radio Resource Control (RRC) connection release request message for releasing a connection with the first network in order to change the RAT to the second network; and
      accessing, by the UE, the second network,
      wherein, when the UE is available to receive MBMS service by adding a frequency of the second network to the frequency of the first network using a carrier aggregation scheme, the determining comprises determining that it is not necessary to release the connection with the first network, and
      wherein, when the UE is not available to receive MBMS service by adding the frequency of the second network to the frequency of the first network using the carrier aggregation scheme, the determining comprises determining that it is necessary to release the connection with the first network.

2. The method of claim 1, wherein accessing the second network comprises performing a cell reselection procedure to connect the second network.

3. The method of claim 1, wherein the RRC connection release request message includes a cause field configured as a value corresponding to a reception of an inter-RAT service.

4. The method of claim 1, wherein the RRC connection release request message comprises a RAT change request message for requesting the change of the RAT from the first network to the second network.

5. The method of claim 4, wherein accessing the second network comprises performing a handover to the second network.

6. The method of claim 4, wherein the RAT change request message includes a cause field configured as a value corresponding to a reception of an inter-RAT service.

7. The method of claim 1, further comprising:
   receiving, from the first network, a message for rejecting the change of the RAT.

8. The method of claim 7, wherein a retransmission of the RRC connection release request message is prohibited during a predetermined duration.

9. A user equipment configured to connect with a first network in a wireless communication system, the user equipment comprising:
   a Radio Frequency (RF) module; and
   a processor operatively connected to the RF module and configured to:
      receive information on at least one service provided from a second network, the information being broadcasted by the second network; and
      when the at least one service comprises a Multimedia Broadcast Multicast Service (MBMS), and when the second network supports the MBMS and the first network does not support the MBMS,
         determines, whether it is necessary for the UE to release a connection with the first network in order to change a RAT (Radio Access Technology) to the second network or not,
         based on the determining, transmit Radio Resource Control (RRC) connection release request message for releasing a connection with the first network, to the first network, in order to a change the RAT to the second network; and
         access the second network,
         wherein, when the UE is available to receive MBMS service by adding a frequency of the second network to the frequency of the first network using a carrier aggregation scheme, the UE determines that it is not necessary to release the connection with the first network, and
         wherein, when the UE is not available to receive MBMS service by adding the frequency of the second network to the frequency of the first network using the carrier aggregation scheme, the UE determines that it is necessary to release the connection with the first network.

10. The user equipment of claim 9, wherein accessing the second network comprises performing a cell reselection procedure to connect the second network.

11. The user equipment of claim 9, wherein the RRC connection release request message includes a cause field configured as a value corresponding to a reception of an inter-RAT service.

12. The user equipment of claim 9, wherein the RRC connection release request message comprises a RAT change request message for requesting the change of the RAT from the first network to the second network.

13. The user equipment of claim 12, wherein accessing the second network comprises performing a handover to the second network.

14. The user equipment of claim 12, wherein the RAT change request message includes a cause field configured as a value corresponding to a reception of an inter-RAT service.

15. The user equipment of claim 9, wherein the processor is further configured to receive, from the first network, a message for rejecting the change of the RAT.

16. The user equipment of claim 15, wherein a retransmission of the RRC connection release request message is prohibited during a predetermined duration.

* * * * *